May 25, 1937. O. S. PETERS 2,081,599
LOAD CONTROL APPARATUS FOR HYDRAULIC TYPE TESTING MACHINES
Filed Nov. 19, 1932 3 Sheets-Sheet 1

Inventor:
O. S. Peters,
Raymond Jones.
Atty.

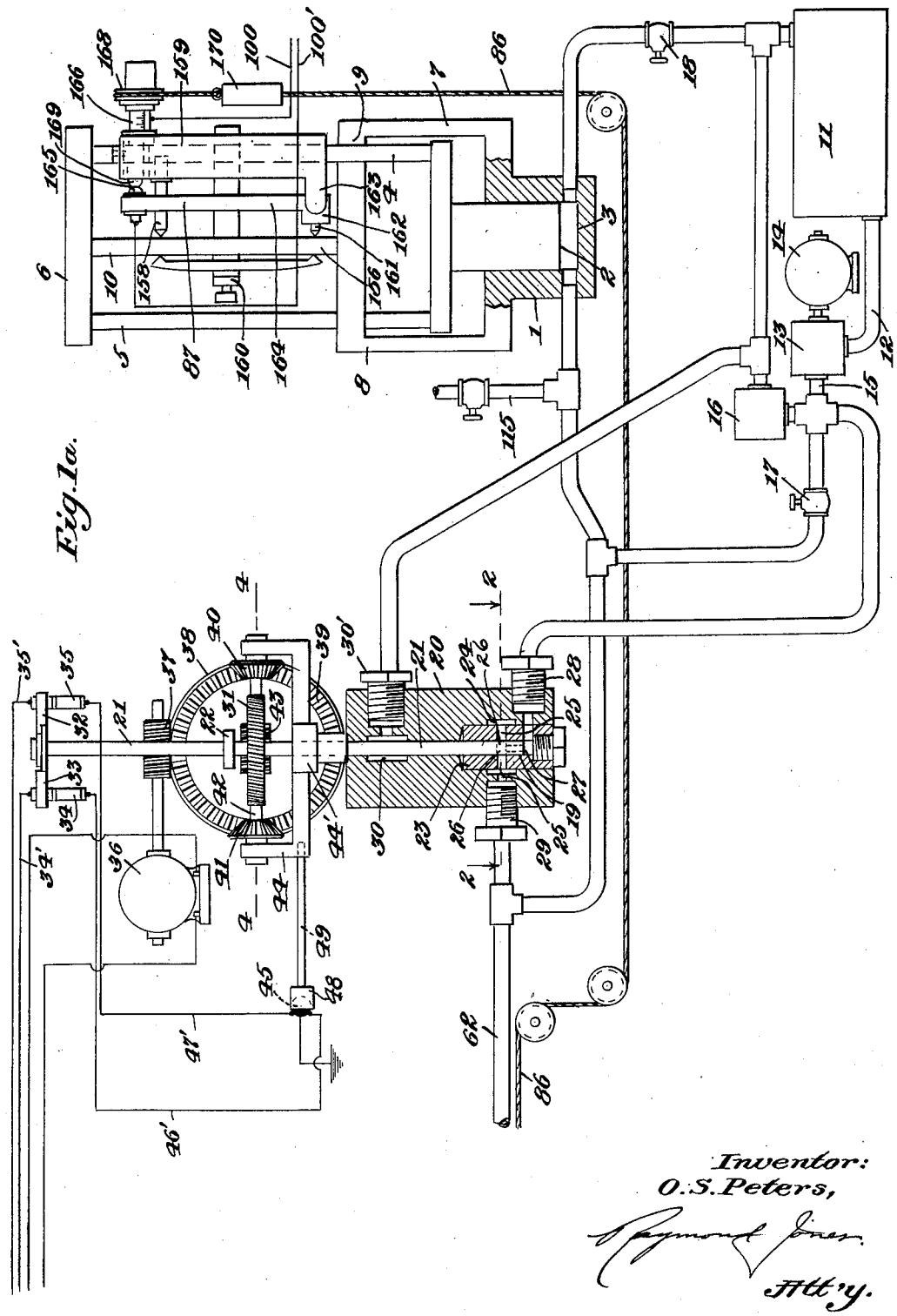

May 25, 1937.  O. S. PETERS  2,081,599
LOAD CONTROL APPARATUS FOR HYDRAULIC TYPE TESTING MACHINES
Filed Nov. 19, 1932  3 Sheets-Sheet 3
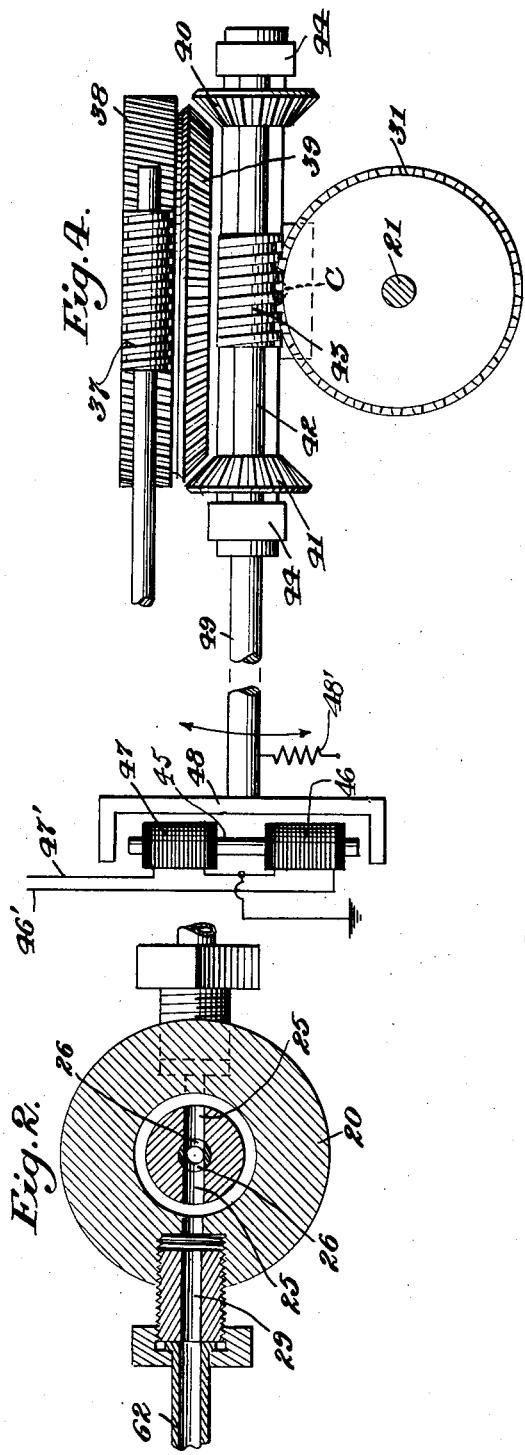
Inventor:
O. S. Peters,
Raymond Jones
Att'y.

Patented May 25, 1937

2,081,599

UNITED STATES PATENT OFFICE 2,081,599

LOAD CONTROL APPARATUS FOR HYDRAULIC TYPE TESTING MACHINES

Orville S. Peters, Chevy Chase, Md., assignor to Baldwin-Southwark Corporation, Philadelphia, Pa.

Application November 19, 1932, Serial No. 643,467

27 Claims. (Cl. 265—14)

This invention relates to a load control apparatus for hydraulic type testing machine, and more specifically to the automatic control of the rate of application of load in hydraulic type testing machines. A hydraulic type testing machine consists essentially of a cylinder closed at one end in which moves a piston or ram, extensions of the piston and cylinder being provided with suitable yokes and grips for holding test specimens so that when pressure is introduced into the cylinder the ram tends to move relatively to the cylinder and apply load to the test specimen. The pressure is commonly applied by means of a pump through manually operated valves which regulate the rate at which pressure is applied. It is generally recognized that the to the cylinder and apply load to the test specimen. The pressure is commonly applied by obtained upon the same material by different testing machines and different operators. It is therefore desirable to apply loads at known rates which can be predetermined and reproduced from time to time. This is possible with manually operated valves but is tedious and is, moreover, subject to personal error on the part of the operator. The latter must depend upon judgment based upon past experience to a large extent, which may vary between different operators. Hence, results obtained by different operators, and on different machines, manually controlled, may not be comparable on account of the rate of application of load not being known.

The main object of my invention is to provide an improved combination of elements adapted to so regulate the application of load to the test specimen in the hydraulic type of testing machine that the rate of application is independent of the personal characteristics of the operator, and can be reproduced by different operators at different times by making use of my invention.

Another object is to provide improved means for varying the rate of application of load to the test specimen whereby any given specimen may be stressed at any desired rate.

Another object is to provide an automatic load control of a testing machine wherein the mechanisms involved are electrically controlled in an improved positive manner.

I accomplish these objects by the means shown in the accompanying drawings, wherein—

Figs. 1 and 1a show a plan view of the apparatus, more or less schematic, showing the parts in their cooperative relation;

Fig. 2 is a sectional view on line 2—2 of Fig. 1a;

Fig. 3 shows details of a switch operating means;

Fig. 4 is a sectional view on line 4—4 of Fig. 1a; and

Fig. 5 shows a clutch control arranged to traverse a chart marker.

Figure 1:
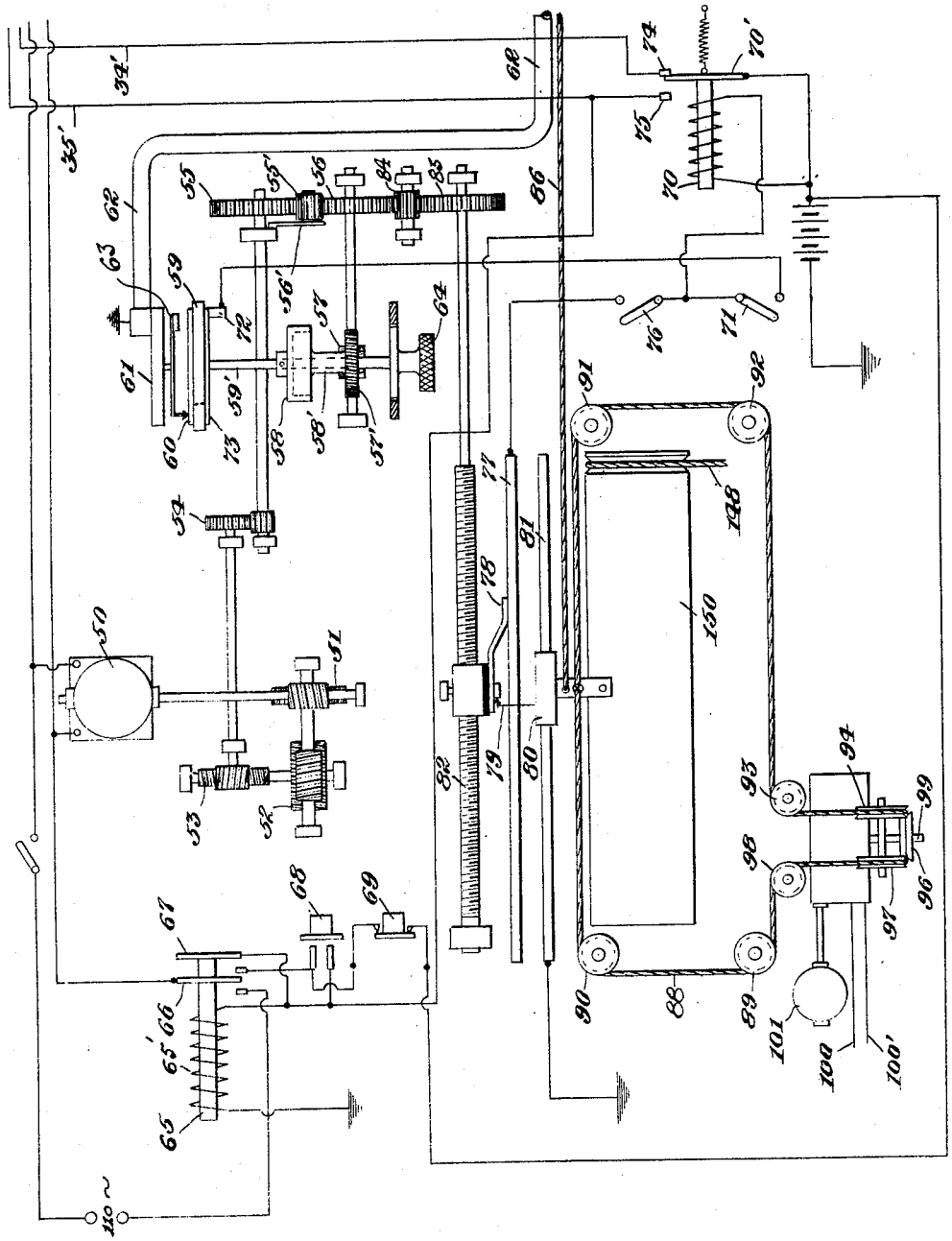

Referring to the drawings in detail, a hydraulic cylinder 1 is provided with a ram 2 which is sustained by the fluid in a chamber 3. The ram 2 carries the upright pieces 4 and 5, which are joined by a yoke 6. The cylinder 1 carries upright pieces 7 and 8 which are joined by a yoke 9. A test piece 10 is secured between the yokes 6 and 9 so that when fluid is introduced into the chamber 3 under pressure the ram 2 tends to rise against the resistance of the test piece 10 and produce stress therein.

A tank 11 serves as a reservoir for the fluid which is drawn therefrom through a pipe 12 by a pump 13, which is driven by a motor 14. From the pump 13, the fluid passes into a pipe 15 from which, in case of excessive pressure, it may pass through a safety valve 16 back into the tank 11. At normal pressures, the fluid may pass through a valve 17, which is manually regulated, into the chamber 3, from whence it may be relieved and allowed to pass into the tank 11 by means of the manually operated valve 18. An alternative path for the fluid from the pipe 15 to chamber 3 is through an automatic valve 19. The manually controlled valve 17 and the automatic valve 19 being in parallel, the regulation may be made fully automatic, partly automatic, and partly manual, or fully manual as desired.

The valve 19 consists of a metal body 20, containing a spindle 21 which is free to turn in the body 20, but is restrained from being forced out by a thrust bearing 22. A core 23 is set into the body 20 and drilled for spindle 21, which is surrounded by a circular recess 24. Into the recess 24, open two stationary ports 25, 25 which communicate with corresponding movable ports 26, 26 in spindle 21 which is drilled on its axis to form a central port at 27. Thus, fluid can pass from inlet 28 to port 27, thence through ports 26, 26 and 25, 25 to recess 24, thence to outlet 29. Since spindle 21 is rotatable in body 20, the ports 25, 25 and 26, 26 may be displaced relatively to each other and the amount of opening controlled. At a given inlet pressure, more or less fluid will flow depending upon the opening.

The spindle 21 fits closely in body 20 and core 23, but is without packing. Hence, fluid may flow past it to recess 30, from which an outlet 30' leads back to tank 11. Since the spindle 21 is surrounded by fluid at inlet pressure, it is free to turn except for the friction in bearing 22 which carries the end thrust.

Spindle 21 extends upward through a worm gear 31, to which it is keyed, thence to the adjustable arms 32 and 33 which, as 21 rotates, in one direction or the other, cause the insulated contact switches 34 or 35 to open. This operation serves to limit the amount of the rotation of the spindle. By adjusting the angular relation between the arms 32 and 33, the rotation of spindle 21 may be limited to small or large arcs, thus controlling the degree of opening of ports 25, 25 and 26, 26.

A continuously operating electric motor 36, through a worm 37 and a worm gear 38 keeps bevel gear 39 in continuous rotation. Two bevel gears 40 and 41 are fixed upon shaft 42 together with a worm 43, which engages the worm gear 31. Shaft 42 rotates in bearings in yoke 44. Yoke 44 rotates in a horizontal plane about a center C directly beneath the pitch circle of worm gear 31, so that when the yoke rotates counterclockwise looking downwardly thereon, the bevel gear 40 engages bevel gear 39 and when the yoke rotates clockwise, the bevel gear 41 engages bevel gear 39, thus producing rotation of shaft 42 in one direction or the other, depending upon which gear 40 or 41 is engaged.

A solenoid 45 is provided with two windings, 46 and 47, to the armature 48 of which is secured the lever 49, which in turn is secured to yoke 44. As either winding 46 or 47 is energized, the armature 48 causes either of bevel gears 40 or 41 to engage bevel gear 39. Thus, by suitable energization of solenoid 45, the armature 48, lever 49, bevel gears 39, 40 and 41, worm 43 and worm gear 31 are made to cooperate with contact switches 34 and 35, to vary the opening of ports 25, 25 and 26, 26 by rotating spindle 21 within predetermined limits.

A synchronous motor 50 drives at a constant rate through back gears 51, 52, 53, 54, 55, 55', 56 and 57, to rotate a friction clutch 58 and a control element or device specifically shown herein as a disk 59. The worm 57 meshes with a worm gear 57' which is integral with the inner member 58', of the clutch. The outer clutch member 58 is pinned to the shaft 59, which drives the disk 59. Members 58 and 58' are frictionally interengaged so that member 58 may be moved to adjust disk 59 without moving the member 58'. A hand grip 64 on the shaft 59' serves to move this shaft and the member 58 to permit rotation of the disk 59 without disengaging the gears at any point. The disk 59 carries a segmental contact piece 60. A Bourdon tube type pressure gage 61 is connected by a pipe 62 to the inlet pipe to chamber 3, so that the pressure in chamber 3 is communicated to Bourdon tube 61, and controls the load automatically as a function of the rotation of disk 59 which is driven at a constant rate by synchronous motor 50. A hand 63 carries a metal contact whisker which makes electrical contact with segment 60 when hand 63 and disk 59 are brought into proper angular relation with each other.

In order to vary the rate of application of load, I provide a means to vary the speed of the disk 59. The gear 55 may be replaced with a gear of different diameter, in which case the idler gear 55' mounted on a pivoted arm 56' is moved so as to be maintained in mesh with both gears 55 and 56.

A double make-contact relay 65 comprises a contact 66 which serves to make the circuit through motors 36 and 50, and a contact 67 which makes coil 65' a holding coil when once closed. Push button stations 68 and 69 serve to start and stop the motors 36 and 50 manually.

A make-and-break circuit relay 70 comprises an armature 70' and a coil which is in series with switch 71, brush 72 and brass ring 73 on the back of disk 59, the brass ring being connected electrically to the contact segment 60. The break contact 74 of relay 70 is in series with switch 34 and winding 46 through conductors 34' and 46' while make contact 75 is in series with switch 35 and winding 47 through conductors 35' and 47'. Thus, when relay 70 is deenergized, contact 74 is closed energizing coil 46 and causing spindle 21 to rotate until arm 33 strikes switch 34 and opens it, stopping the rotation of spindle 21 by releasing lever 49. When relay 70 is energized, contact 75 is closed, energizing coil 47 which causes spindle 21 to rotate in the opposite direction until arm 32 strikes switch 35 and opens it, stopping the rotation of spindle 21 by releasing lever 49.

A second switch 76 provides a means by which relay 70 may be made to operate from another device which controls the load automatically as a function of the strain in the specimen 10. In this case, switch 71 is opened and switch 76 closed which completes a circuit to insulated contact bar 77, insulated contact brush 78, and contact whisker 79, which is carried by a pencil carriage 80, which rides upon a guide rod 81, which is grounded. Contact brush 78 is moved at a constant rate along a screw 82 through the medium of gears 56, 84, 85 which are driven from motor 50 at a constant rate. Pencil carriage 80, by means of cord 86, is mechanically connected to extensometer 87, which by means of electrical contacts, relay and clutch mechanisms causes the pencil carriage 80 to move in proportion to the changes in strain in specimen 10. Through the means above described, the carriage 80 is constrained to move at the same rate as the brush 78.

The carriage 80 is moved to the right by increments by means of a cord 88 which passes over pulleys 89 to 94 and 96 to 98. The main cord driving pulley 96 is rotated by a shaft 99 which is rotated in response to variations in strain in a manner disclosed in a copending application of O. S. Peters and G. S. von Heydekampf, Serial No. 587,064, filed January 16, 1932. The recording drum 150 is rotated in accordance with variations in pressure in the chamber 3 by means of a cord 148 which is driven by mechanism shown in that application, the pressure control of which may be transmitted from a branch fluid conduit 115. The relay and selective power transmission is shown conventionally in Fig. 1 and in detail in Fig. 5. A constant speed motor 101 through gears 103, 104 drives a shaft 102 which in turn through the gears 105, 107 drives a gear 109. Two clutch gears 187, 188 rigid on a shaft 186 may be selectively shifted to engage the gear 109. The conductors 100, 100' lead from the micrometer contacts 165, 169 through a battery 176 and relay coil 177. Deenergization of this coil permits closure of armature contact 178 upon breaking of the micrometer contacts due to specimen elongation. A circuit is then completed through battery 179 and a solenoid coil 180, the core armature of which comprises one end of a lever 181 secured to a yoke 182 upon which the shaft 186 is rotatably mounted A spiral gear 189 on the shaft 186 engages a spiral gear 190 on the shaft of which is mounted a worm 191 which engages with a worm gear 192. The shaft 99 of gear 192 carries the pulley 96. The yoke 182 will be rotated clockwise around a center 183 upon energization of the coil 180. The gear 187 will swing along an arc to come into engagement with the gear 109, thereby rotating gears 187, 189, 190, 191, 192 and shaft 99. The gear 188 may be driven by the gear 109 for traversing the chart marker in an opposite direction. To do this, however, the control coil 180 will be associated with the lever 181 in a manner to shift the yoke 182 counterclockwise. When the coil 180 is deenergized, gear 187 will be pushed away from and by the gear 109 to return the yoke to neutral position, or a spring may be used if desired to return the yoke. Springs 48' and 181' are provided to retain yokes 48 and 182 in a neutral position when the respective solenoids are deenergized.

In the operation of my device, with the switch 71 closed and with pump 13 in operation, valves 17 and 18 are closed which causes fluid to flow through the partly open ports 25, 26 of the automatic valve 19 causing a rise of pressure in chamber 3 which is communicated to gage 61, causing rotation of hand 63 which immediately comes in contact with segment 60, closing contact 75 which energizes coil 65', closing contacts 66 and 67. Contact 66 puts motors 36 and 50 in operation while contact 67 causes coil 65' to remain energized, until released by button 69. Contact 75 also energizes coil 47 which causes spindle 21 to rotate in the proper direction to close ports 25, 25 and 26, 26, reducing the rate of flow until disk 59, which continues to rotate, causes hand 63 and segment 60 to separate. This deenergizes relay 70, causing contact 74 to close to energize coil 46, which reverses the direction of rotation of spindle 21, opening ports 25, 25 and 26, 26 which increases the rate of flow of fluid. Thus, as contact between segment 60 and hand 63 is alternately made and broken, ports 25, 25 and 26, 26 alternately tend to close and open, causing hand 63, through the medium of the pressure in chamber 3 to remain in close cooperation with segment 60, and since the movement of hand 63 is proportional to pressure, and segment 60 to time, the pressure in chamber 3 is made to increase at a constant rate.

With switch 71 open and switch 76 closed, the operation is as follows: Through motor 50, brush contact 78 is made to move at a constant rate by screw 82. As load is applied to specimen 10 by introducing fluid into chamber 3 through valve 19, strain is induced in the specimen which causes extensometer 87, through operation of yoke 182 and shaft 99, to advance pencil carriage 80, bringing contact whisker 79 in contact with brush 78 which energizes relay 70, causing rotation of spindle 21 to reduce the flow through valve 19 until brush 78 breaks contact with whisker 79, reversing the rotation of spindle 21, and increasing the rate of flow through valve 19, causing whisker 79 to overtake brush 78. Thus, the flow of fluid is so regulated as to maintain close cooperation between brush 78 and contact 79, the brush 78 moving in proportion to time and contact 79 in proportion to strain, so that contact 79 is made to advance at a constant rate and the specimen is strained at a constant rate.

The degree of constancy of increase of load or strain is determined by the closeness of the cooperation between segment 60 and hand 63, or contacts 78 and 79. This in practical applications has been found to be so close that for engineering purposes the rate of increase of load or strain may be said to be constant, although, theoretically, it may be said to advance by steps, the steps, however, being so small that for practical purposes they may be considered a straight line. These steps may be made smaller or larger by adjusting the arms 32 and 33 towards or away from the switches 34, 35.

While I have shown and described a preferred form of my invention for the purpose of illustration thereof and disclosure of its principle, it is to be understood that various modifications are contemplated such as may be embraced within the scope of the claims which follow.

What I claim is—

1. In a testing machine in combination, means for supporting a specimen, a control device, means for driving said device at a constant speed, hydraulic responsive means for applying stress to said specimen, and means operably associated with said control device for causing increments of pressure to be applied to the hydraulic responsive means so that the stress exerted thereby on said specimen increases at a uniform rate.

2. In a testing machine in combination, means for supporting a specimen, a source of fluid pressure, means responsive to the fluid pressure for stressing said specimen, a control device, means for driving said device at a predetermined speed, a valve for controlling fluid flow from said source to said stressing means, and means responsive to operation of the control device for automatically controlling said valve to effect application of stress to said specimen in accordance with said predetermined speed.

3. In a testing machine in combination, means for supporting a specimen, a source of fluid pressure, means responsive to fluid pressure for stressing said specimen, a valve for controlling fluid flow from said source to said last named means, a control device, means operably responsive to operation of the control device for automatically varying the position of said valve to provide a uniform rate of application of stress to said specimen, and means whereby the rate of application of stress to the specimen may be varied.

4. In a testing machine, a source of fluid pressure, means responsive to fluid pressure for stressing a specimen, a valve for controlling fluid flow from said source to said means, a control device, means for moving said device at a constant speed, and means associated with said device for controlling said valve so as to impart stress to said specimen at a uniform rate.

5. In a testing machine, a control element, means for driving said element at a constant speed, means for applying stress to a specimen, a contact on said element, a second contact, means operably responsive to said stress for moving said second contact in the path of movement of said other contact, a circuit including said contacts, and means operably responsive to closure of said circuit by said contacts for controlling the application of stress to said specimen.

6. In a testing machine, a source of fluid pressure, means responsive to said fluid pressure for stressing a specimen, a valve for controlling fluid flow from said source to said means, a switch operably responsive to movement of said valve, a control element, a contact on said element, means for moving said element at a constant speed, a contact in the path of movement of said other contact, a relay, a circuit including said contacts and relay, and a circuit controlled by said relay and including said switch.

7. In a testing machine in combination, a control element, means for driving said element at a constant speed, hydraulic responsive means for applying stress to a specimen, means associated with said control element and movable in response to variation in stress applied to said specimen, and means associated with said control element and said last named means for causing increments of pressure to be applied to the hydraulic responsive means so that the stress exerted thereby on said specimen increases at a uniform rate.

8. In a testing machine in combination, means for supporting a specimen, a control element, means for driving said element at a constant speed, means for applying stress to said specimen, contact means associated with said element and movable in response to variations in said stress, a contact on said element, a circuit including said contacts, and means operably responsive to closure of said circuit by said contacts for controlling the application of stress to said specimen.

9. In a testing machine in combination, means for supporting a specimen, a source of fluid pressure, means responsive to said fluid pressure for stressing said specimen, a valve for controlling fluid flow from said source to said last named means, a control element, means for driving said element at a constant speed, and means associated with said control element and operably connected to said valve for controlling the same so as to impart a uniform rate of application of fluid pressure to said stressing means.

10. In a testing machine in combination, means for supporting a specimen, a source of fluid pressure, means responsive to said fluid pressure for stressing said specimen, a valve for controlling fluid flow from said source to said last named means, a control element, means for driving said element at a constant speed, means positioned adjacent said element and movable in response to said fluid pressure, coacting contacts on said last named means and said element, a circuit including said contacts, and means responsive to energization of said circuit upon closure of said contacts for actuating said valve.

11. In a testing machine in combination, means for supporting a specimen, a control contact, means for moving said contact at a constant speed, a second contact, means for applying stress to said specimen, means operably responsive to application of said stress for moving said second contact to engage the control contact, and means operably responsive to engagement of said contacts for controlling the rate of application of stress to said specimen.

12. In a testing machine in combination, means for supporting a specimen, a source of fluid pressure, means responsive to said fluid pressure for stressing said specimen, a valve for controlling fluid flow from said source to said last named means, a selective power transmission for moving said valve toward open or closed positions, a solenoid for controlling said transmission, a switch, a circuit including said solenoid and switch, and means operably responsive to movement of said valve for opening said switch to deenergize the solenoid.

13. In a testing machine in combination, means for supporting a specimen, a source of fluid pressure, means responsive to fluid pressure for stressing said specimen, a valve for controlling fluid flow from said source to said last named means, a selective power transmission for moving said valve toward open or closed positions, solenoids selectively operable for controlling said transmission, a circuit for each solenoid, a switch in each circuit, and means operably responsive to movement of said valve for selectively opening said switches.

14. In a testing machine in combination, means for supporting a specimen, a source of fluid pressure, means responsive to said fluid pressure for stressing said specimen, a valve for controlling fluid flow from said source to said last named means, a selective power transmission for moving said valve toward open or closed positions, a solenoid for controlling said transmission, a switch, a circuit including said solenoid and switch, a control device, means for moving said device at constant speed, a member adjacent said device, means for moving said member in response to application of fluid pressure, a contact on said device, a contact on said member, a relay, a circuit including said relay and contacts, said relay being energized by closure of said contacts to close said first named circuit, and means operably responsive to movement of said valve for opening said switch to deenergize the solenoid.

15. In a testing machine in combination, means for supporting a specimen, a control device, means for driving said device at a constant speed, means for applying stress to said specimen, means associated with said control device and movable in response to strain between spaced points on said specimen, and means associated with said control device and said last named means for causing a uniform deformation of said specimen.

16. In a testing machine in combination, means for supporting a specimen, means for applying stress to said specimen, a control device, means for moving said device at a constant speed, a member associated with said device, means for moving said member in response to variations in strain in said specimen, cooperating contacts on said device and member, a circuit including said contacts, and means operably responsive to closure of said circuit by said contacts for varying the application of stress to produce a uniform rate of change of strain in the specimen.

17. In a testing machine, fluid pressure means for applying increments of stress to a specimen, a recording chart, a chart marker, a contact associated with said marker, and means to move said contact in one direction in response to variations of strain in the specimen, a cooperating second contact, and means to move said second contact at a constant speed, a circuit including said contacts, and means responsive to energization of said circuit upon closure of said contacts for controlling the rate of application of stress to the specimen.

18. In a testing machine, fluid pressure means for applying increments of stress to a specimen, a recording chart, a chart marker, a contact associated with said marker, means to move said contact in one direction in response to variations of strain in the specimen, a cooperating second contact, means to move said second contact at a constant speed, a circuit including said contacts, a valve for controlling said fluid pressure means, and means responsive to energization of said circuit upon closure of said contacts for varying the position of said valve to provide a uniform rate of change of strain in the specimen.

19. In a testing machine in combination, means for supporting a specimen, means for applying a stress to said specimen, separate control devices, means for moving each of said devices at a constant speed, a supplemental control member adjacent each device, means for moving one member in proportion to stress applied to the specimen, means for moving the other member in proportion to strain produced in the specimen, each device and adjacent member being provided with cooperating contacts forming pairs, a circuit including each pair of contacts, a relay coil, means for selectively connecting said coil with each circuit, said coil being energized upon closure of a related circuit by said contacts, and means operably responsive to operation of said relay for controlling the application of stress to said specimen.

20. In a testing machine, in combination, means for supporting a specimen, load producing means for applying load to said specimen, a device operable to determine the load to be applied to a specimen, mechanism adapted to operate said device at a predetermined rate irrespective of the load actually applied to the specimen during testing thereof, and means operatively associated with said device for causing said load producing means to load said specimen at said predetermined rate.

21. In a testing machine, in combination, means for supporting a specimen, hydraulic load producing means for stressing said specimen, a fluid pump for supplying operating fluid to said load producing means, mechanism adapted to vary the rate of flow of operating fluid from said pump to said load producing means, a control device, means for driving said device at a predetermined rate of speed, and means operably associated with said control device for controlling said mechanism to effect load application to said specimen in accordance with said predetermined rate.

22. In a testing machine, in combination, means for supporting a specimen, means for applying a load thereto, an element movable at a predetermined speed for determining the rate at which it is desired to apply load to the specimen, a second element movable in accordance with the load on the specimen, and means cooperating with each of said elements for controlling application of load to the specimen automatically in accordance with said desired predetermined rate.

23. In a testing machine, in combination, means for supporting a specimen, means for applying a load thereto, an element adapted to be progressively movable in one direction during a testing operation and at a predetermined speed for determining the rate at which it is desired to apply load to the specimen, a second element, means for progressively moving the latter in the same direction and in accordance with the load on the specimen during said testing operation, and means cooperating with said elements for controlling the application of load to the specimen automatically in accordance with said desired predetermined rate.

24. In a testing machine, in combination, means for supporting a specimen, means for applying load thereto, means actuated by the deformation of the specimen between spaced points thereon, and means cooperating with said actuated means for effecting a predetermined rate of strain of said specimen between said points.

25. In a testing machine, in combination, means for supporting a specimen, means for applying load thereto, an element movable at a predetermined speed for determining the rate at which it is desired to strain the specimen, a second element actuated by the deformation of the specimen between spaced points thereon, and means cooperating with each of said elements for controlling application of load to the specimen automatically in accordance with said desired predetermined rate.

26. In a testing machine, in combination, means for supporting a specimen, means for applying load thereto, an element progressively movable in one direction during a testing operation and at a predetermined speed for determining the rate at which it is desired to strain the specimen, a second element also progressively movable in the same direction and actuated by the deformation of the specimen between spaced points thereon during said testing operation, and means cooperating with said elements for controlling the application of load to the specimen automatically in accordance with said desired predetermined rate of strain.

27. In a testing machine, in combination, means for supporting a specimen, load producing means therefor, a source of power for said load producing means, mechanism for controlling said power, an element responsive to the load on said specimen, means for determining the load desired to be applied to the specimen, and means cooperating with said means and element for controlling said mechanism to obtain said desired load.

ORVILLE S. PETERS.

CERTIFICATE OF CORRECTION.

Patent No. 2,081,599.            May 25, 1937.

ORVILLE S. PETERS.

It is hereby certified that error appears in the printed specification of the above numbered patent requiring correction as follows: Page 1, first column, line 18, after "by" insert the words means of a pump through manually operated valves which regulate the rate at which pressure is applied. It is generally recognized that the rate at which load is applied to the test specimen is an important factor in comparing results; page 2, first column, line 49, for the reference numeral "59" read 59'; page 5, first column, line 16, claim 19, for "each" read either; and that the said Letters Patent should be read with these corrections therein that the same may conform to the record of the case in the Patent Office.

Signed and sealed this 26th day of October, A. D. 1937.

(Seal)                                      Henry Van Arsdale,
Acting Commissioner of Patents.